Sept. 27, 1927.  P. S. HASELTON  1,643,656

ELECTRIC LAWN MOWER

Filed Oct. 1, 1925   2 Sheets-Sheet 1

Inventor
Page S. Haselton
By his Attorneys
Ward, Crosby, & Smith

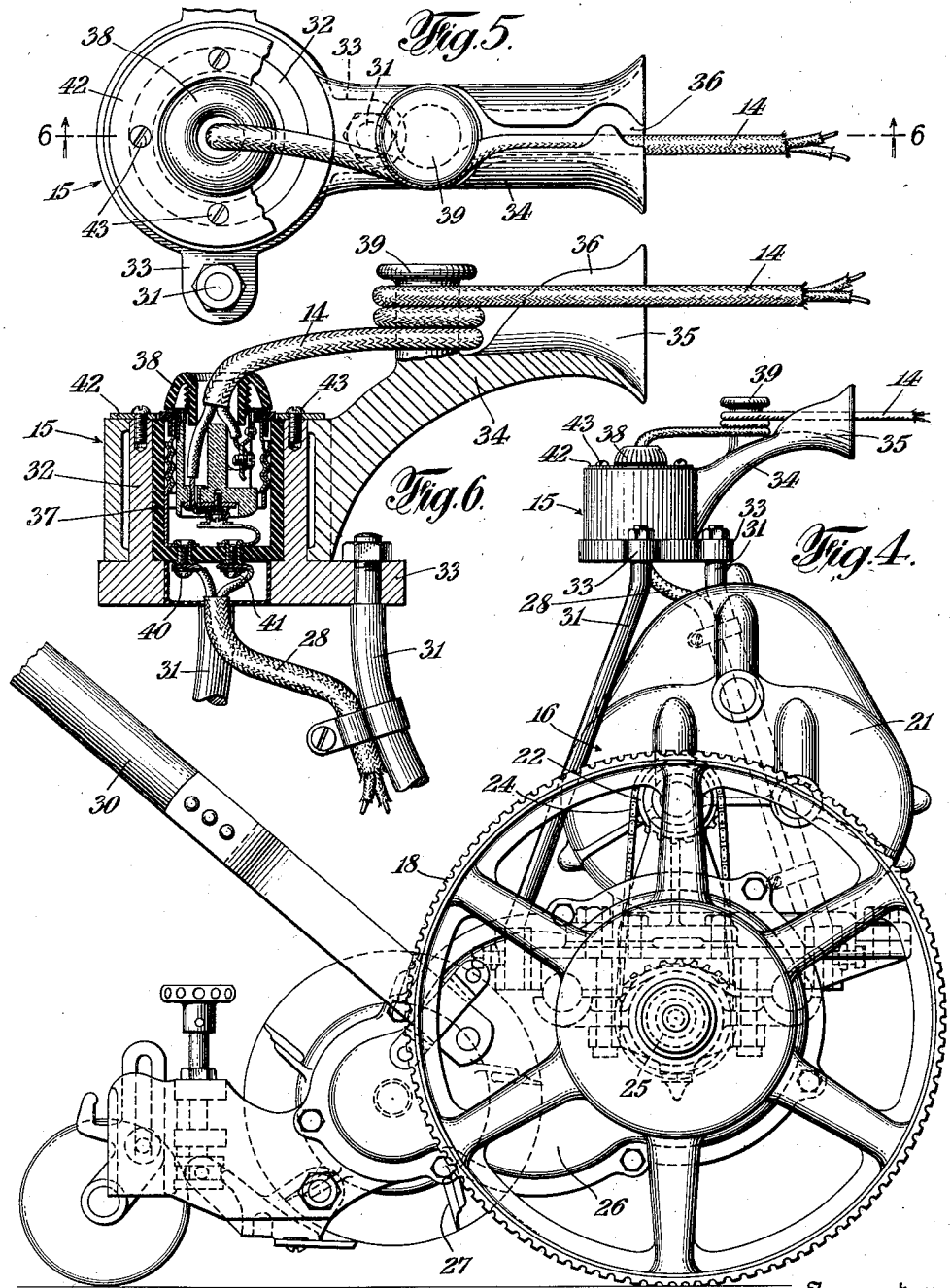

Patented Sept. 27, 1927.

1,643,656

UNITED STATES PATENT OFFICE.

PAGE S. HASELTON, OF BAYSIDE, NEW YORK, ASSIGNOR TO COLDWELL LAWN MOWER COMPANY, OF NEWBURGH, NEW YORK, A CORPORATION OF NEW YORK.

ELECTRIC LAWN MOWER.

Application filed October 1, 1925. Serial No. 59,794.

This invention relates to motor driven implements such as agricultural machines including lawn mowers and more particularly machines which may be driven by an electrical motor.

One of the objects of this invention is to provide a motor driven machine having an improved and novel form of take-up reel arrangement for the electrical conductor to the motor, such reel being mounted independently of the machine. In accordance with this invention, the take-up reel is preferably of a portable type adapted to be deposited at various convenient locations, for example, upon the lawn, in case the invention is to be used in connection with a lawn mower. With this arrangement a very long length of wire and a comparatively large reel may be used without interfering with the operation of the lawn mower or other machine. The machine may therefore be relatively light in weight and consequently easy to operate even though a long conductor and heavy reel are used in connection therewith.

Another advantage of arrangement embodying this invention is that a single standard reel unit may be used alternatively with a variety of implements such as lawn mowers, garden tractors or other machines.

A further object of this invention is to provide swivel connector means at the machine to which the conductor wire may be quickly attached or detached, and strain-relieving means also being provided for relieving the detachable connector of the strain resulting from the tension applied to the conductor by the take-up reel.

A still further aim of the invention is to provide an arrangement including a portable but stable form of self-winding reel, which may be of a form having two drums, one for a conductor cable extending to the source of current and the other for a conductor cable extending to the machine to be operated. Such a form of reel may be placed at a location intermediate between the source of current and the machine and serves to divide the conductor into two shorter portions which may be readily controlled by the action of the reel and in most instances kept from contact with the ground. Furthermore, such conductor cables extending from the double reel in substantially opposite directions permit the tensions in the conductors at the reel to be substantially equalized and thus the reel frame is relieved of excessive strain.

Further objects of this invention include the provision of simple, durable and inexpensive constructions for the purposes desired, such constructions embodying a small number of parts and being dependable and certain in their operation.

The invention consists in the novel features, arrangements and combinations of parts embodied by way of example in the apparatus hereinafter described, as illustrating a preferred form of the invention, and the invention may more particularly be pointed out in the appended claims.

In the accompanying drawings—

Fig. 4 is enlarged side elevational view of the machine shown in Fig. 3;

Fig. 5 is a top view of the conductor receiving and supporting means used upon the machine of Figures 3 and 4; and Fig. 6 is a central sectional view taken substantially along the line 6—6 of Fig. 5.

Figure 1:
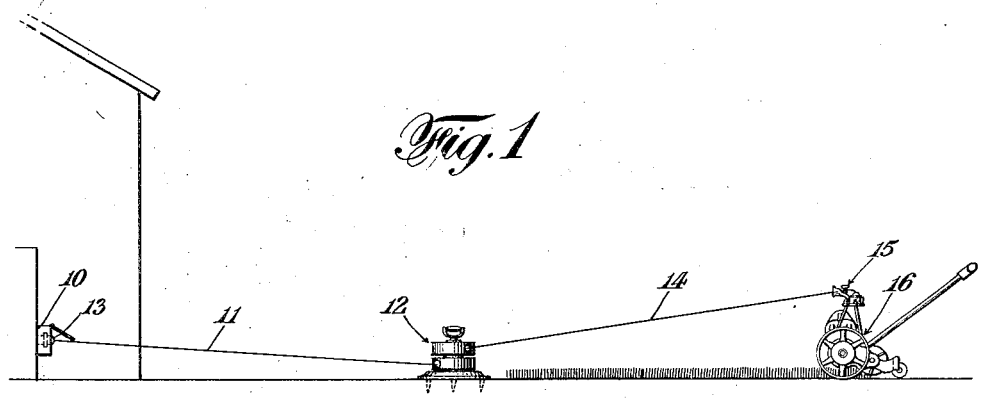
Fig. 1 shows a preferred embodiment of the invention in use with an electric motor driven lawn mower.

Referring to drawings in further detail, the arrangement shown in Fig. 1 may comprise a source of electric current at 10, a conductor 11 extending from such source to a double reel device 12, the conductor 11 being provided with any suitable form of detachable connecting device 13 at the source of current. A conductor 14 extends from the reel 12 to a conductor receiving and supporting means 15 forming a part of the motor driven implement 16 which in this instance is illustrated as a lawn mower.

Figure 3:
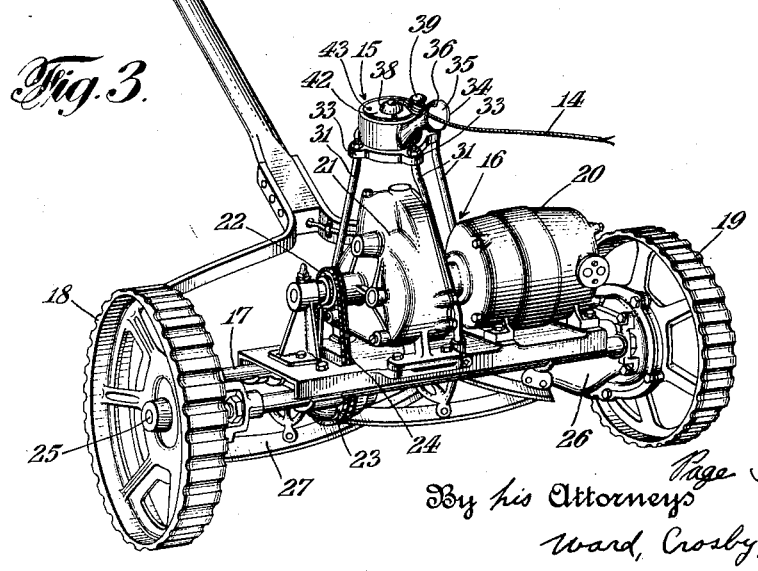
Fig. 3 is a perspective front view of a lawn mower fitted with the conductor receiving and supporting means embodying this invention.

The law mower and associated conductor supporting means will now be described in further detail. As indicated in Figures 3 and 4, the mower may comprise frame members as at 17 mounted upon drive wheels 18 and 19 which are designed to be driven by an electrical motor 20. Suitable power transmitting mechanism for driving the machine by the motor may include a reduction gear assembly 21. Suitable sprockets as at 22 and 23 cooperating with a chain 24 may be provided to operate a drive shaft 25 by power delivered from the reduction gear. Suitable gearing of the usual type may be provided in side frame portions 26 for driving a conventional form of revolving cutter 27.

Current to the motor 20 may be supplied through the conductor 14 extending to the conductor receiving means at 15. From this receiving means connector wires within a cable 28 extend to the motor and to a control switch 29 mounted upon a handle 30 of the lawn mower.

The conductor receiving means 15 may be supported in an elevated position above the other working parts of the machine by means of supporting rods as at 31 which extend down into engagement with the lawn mower frame. The conductor receiving means may comprise the member 32 having a suitable flanged portion 33 for receiving the supports 31 and a vertically extending cylindrical portion upon which a conductor supporting arm 34 is rotatably mounted. The supporting arm 34 may be provided with a flared outlet portion 35 from which the conductor 14 may be freely led away in the desired direction substantially without abrasion. As shown in Fig. 5, the flared outlet portion may be slotted as at 36 along its upper side to permit the conductor to be introduced. The slot is preferably of irregular shape as illustrated so that the conductor will be kept from accidently coming out. The vertically extending cylindrical portion of the member 32 at its center may be provided with a conventional form of insulated electric receptacle 37 for receiving any suitable form of swivel connector plug 38 fixed upon the ends of the conductor cable 14.

In order to relieve the tension in the cable 14 caused by the take-up reel 12 and to prevent such tension from wearing or injuring the swivel plug 38, a suitable strain relieving device may be provided at 39. In the form indicated, the strain relieving device merely comprises an upstanding post around which several turns of the conductor cable may be taken. The connector wires within the cable 28 above referred to may be electrically connected to the receptacle 37 by suitable terminal members 40 and 41. An annular retaining ring 42 may be fastened to the upper edge of the member 32 as by screws 43. As indicated, this ring is of sufficient width to retain the receptacle 37 and the rotatable arm 34 in their respective positions.

Figure 2:
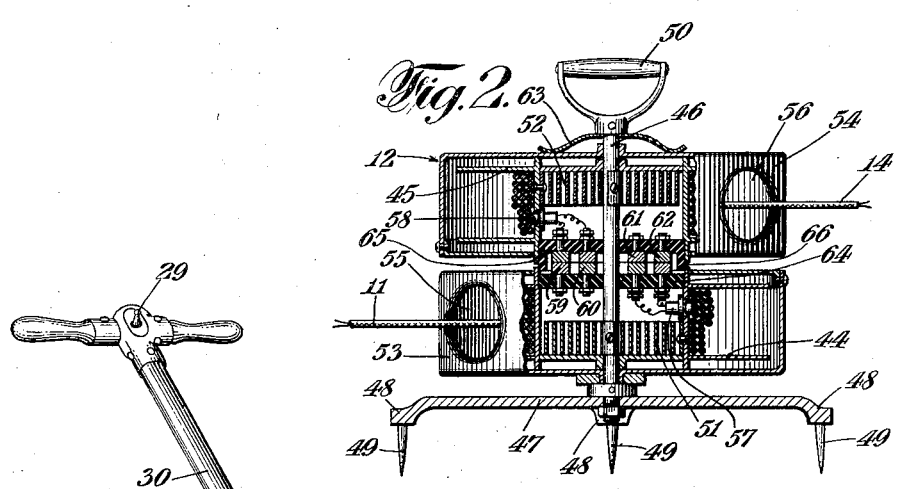
Fig. 2 is an elevational view partly in section illustrating a conductor reel embodied in the invention.

The conductor take-up reel as illustrated in Fig. 2 will now be described in further detail. Separate drums 44 and 45 respectively are provided for the conductors 14 and 11. These drums are arranged to rotate in horizontal planes and are preferably mounted upon a single vertically extending shaft 46 fixed at lower end to a frame 47. The frame 47 may be formed with a plurality of foot members 48 each provided with suitable means such as spikes 49 for engaging the lawn or earth and firmly holding the reel at the desired location. At the upper end of the shaft 46, a handle 50 may be provided by which the reel may be carried and also by which the retaining spikes 49 may be forced into the ground.

The drums 44 and 45 respectively may be provided with winding springs 51 and 52, preferably connected to wind their respective drums in opposite directions in order to substantially balance the forces about the shaft 46. The drums respectively may be provided with housings 53 and 54 having large outlet openings 55 and 56 for the conductors 11 and 14 respectively. The inner ends of the conductors may be provided respectively with quick-detachable connector plugs 57 and 58 so that in case the conductor becomes fully unwound from the drums, the end of the conductor will be automatically released and current to the lawn mower or other machine will be immediately cut off.

In order to conduct current from the conductor 11 upon the drum 44 to the conductor 14 upon the drum 45, contact rings 59 and 60 may be provided on the drum 44 and engaging contact rings 61 and 62 mounted upon the adjacent face of the drum 45.

A spring member 63 encircling the shaft 46 and acting between the handle 50 and the upper drum housing 54 serves to press the drum 45 downwardly so that its contacts 61 and 62 firmly engage the contacts 59 and 60 at all times. Suitable connector wires may be supplied between the contact rings and the quick-detachable plugs 57 and 58 as will readily be understood.

As indicated the contact rings may be mounted within suitable insulation discs 64 and 65 forming parts of the drums 44 and 45 respectively. The disc 65 may be formed with an overhanging flange 66 for guarding the contact rings and for preventing dirt or grass from interfering with the operation thereof.

While I have described my improvements in great detail and in connection with a preferred form thereof, I do not desire to be limited to such details or form since many changes and modifications may be made and the invention embodied in widely different forms without departing from the spirit and scope of the invention in its broader aspects. Therefore I desire to cover all modifications and forms coming within the language or scope of any one or more of the appended claims.

What I claim as new and desire to secure by Letters Patent is:

1. In combination, lawn mower mechanism, a handle extending upwardly therefrom whereby the operator may steer the machine, an electric motor connected with and adapted to propel the mower mechanism, means for supplying current to said motor comprising a flexible conductor having a swivelled connection to a part on said mower mechanism, a strain-relieving means rotatable around said swivelled connection, and a self-retracting reel deposited at a fixed position remote from the mower, said conductor extending directly from said strain-relieving means to said reel.

2. In combination, lawn mower mechanism, a handle extending upwardly therefrom whereby the operator may steer the machine, an electric motor connected with and adapted to propel the mower mechanism, means for supplying current to said motor comprising a flexible conductor, a conductor support on the mower mechanism and extending upwardly to a point above the other working parts thereof, a detachable conductor connector and swivel means therefor on said support, a combined strain relieving means and conductor guiding arm rotatably mounted on said support for leading the conductor directly from the mower in any substantially horizontal direction, and a self-retracting reel secured at a point remote from the mower, said conductor extending directly from said conductor support on the mower to said reel and being constantly held under tension by said reel during the operation of the mower.

3. In combination, an electric motor driven traveling implement, means for supplying current to the motor thereof comprising a flexible conductor with a swiveled connection at the implement, means on the implement for directing the conductor and supporting the same without sharp bends when directed from the implement in any substantially horizontal direction, and stationary means independent of the implement for gathering up the conductor and maintaining the same under tension.

4. In combination, lawn mower mechanism, a handle extending upwardly therefrom whereby the operator may steer the machine, an electric motor connected with and adapted to propel the mower mechanism, means for supplying current to said motor comprising a flexible conductor with a swivelled support and swivelled detachable connection at the mower and extending directly therefrom to a desired fixed point remote from the mower, and means at said fixed point for constantly holding the conductor under tension during the operation of the mower.

5. In combination, a traveling agricultural implement or machine, a handle extending upwardly therefrom whereby the operator may steer the machine, an electric motor connected with and adapted to propel the machine, means for supplying current to said motor comprising a flexible conductor with a swivelled detachable connection at the machine, and a self-retracting reel having a swivelled outlet member and being deposited at a position remote from the machine, said conductor extending directly from said connection at the machine to the reel and being constantly held under tension by said reel during the operation of the machine.

6. In combination, electric motor driven lawn mower mechanism, means for supplying current to the motor comprising a flexible conductor with a swivelled separable plug and socket connection at the mower, and a self-retracting reel deposited at a position remote from the mower, said conductor extending directly from said connection at the mower to the reel and being constantly held under tension by said reel during the operation of the mower.

7. In combination, electric motor driven lawn mower mechanism, means for supplying current to the motor comprising a flexible conductor, an elevated conductor support on the mower mechanism, a detachable conductor connector and swivel means therefor on said support, a conductor guiding arm rotatably mounted on said support for leading the conductor directly from the mower in any substantially horizontal direction, and a self-retracting reel secured at a point remote from the mower, said conductor extending directly from said conductor support on the mower to said reel and being constantly held under tension by said reel during the operation of the mower.

8. In combination, electric motor driven lawn mower mechanism, means for supplying current to the motor comprising a flexible conductor, an elevated conductor support on the mower mechanism, a combined strain relieving means and conductor guiding arm rotatably mounted on said support for leading the conductor directly from the mower in any substantially horizontal direction, and a self-retracting reel at a fixed point remote from the mower, said conductor extending directly from said conductor support on the mower to said reel and being constantly held under tension by said reel during the operation of the mower.

9. In combination, lawn mower mechanism, a handle extending upwardly therefrom whereby the operator may steer the machine, an electric motor connected with and adapted to propel the mower mechanism, means for supplying current to said motor comprising a flexible conductor, a conductor support on the mower mechanism and extending upwardly to a point above the other working parts thereof, a conductor guiding arm rotatably mounted on said support for leading the conductor directly from the mower in any substantially horizontal direction, and a self-retracting reel secured at a point remote from the mower, said conductor extending directly from said conductor support on the mower to said reel and being constantly held under tension by said reel during the operation of the mower.

10. In combination, a traveling agricultural implement or machine, a handle extending upwardly therefrom whereby the operator may steer the machine, an electric motor connected with and adapted to propel the machine mechanism, an elevated conductor support on the machine mechanism, and electrical connections to the motor terminating in a swivelled separable plug and socket connection at the upper end of said support.

11. In combination, lawn mower mechanism, a handle extending upwardly therefrom whereby the operator may steer the machine, an electric motor connected with and adapted to propel the mower mechanism, a conductor support on the mower mechanism and extending upwardly to a point above the working parts thereof, and electrical connections to the motor, including a control switch on the handle and a terminal comprising a separable plug and socket connection at the upper end of said support.

12. The combination of a lawn mower, an electric motor driving the same and carried thereby, a portable take-up reel independent of the mower, a conductor wound upon said reel, means for fixing the reel on the lawn at any desired point, the free end of said conductor being connected to the mower, and electrical connections connecting the free end of said conductor with the motor to energize the same, and steering means for the mower arranged independently of said conductor.

13. In combination, an electrically driven traveling agricultural implement or machine, means for conducting current thereto comprising a flexible conductor detachably connected thereto, a portable spring reel for holding the conductor constantly under tension during the operation of the implement, and means on said reel with which to securely spike the same to the earth at any desired point remote from the implement and notwithstanding such tension on the conductor.

14. In combination, an electrically driven lawn mower, means for conducting current thereto comprising a flexible conductor detachably connected thereto by a separable plug and socket connection, and a portable self-retracting reel to be deposited at a point remote from the mower for holding the conductor constantly under tension during the operation of the mower, said reel having its drum rotatable in a horizontal plane whereby the conductor may be freely led away therefrom in various directions.

15. In combination, an electrically driven traveling agricultural implement, means for conducting current thereto comprising a flexible conductor detachably connected thereto, and a portable self-retracting double reel having two cable drums, one providing for the conductor attached to the implement and the other providing for conductor cable extending to a stationary source of electric current, said drums being mounted upon a single vertical shaft and being rotatable in horizontal planes whereby the conductor may be freely led away from either drum in various directions, means for conducting current from the conductor on one drum to the conductor on the other, notwithstanding rotation of the drums, and means on said reel with which to securely but removably spike the same to the lawn at a point remote from the implement.

16. In combination, an electrically driven lawn mower, means for conducting current thereto comprising a flexible conductor detachably connected thereto and a portable self-retracting double reel having two cable drums, one providing for the conductor attached to the mower and the other providing for conductor cable extending to a stationary source of electric current, and means on said reel with which to securely but removably spike the same to the lawn at a point remote from the mower.

17. In combination, an electrically driven lawn mower, means for conducting current thereto comprising a flexible conductor detachably connected thereto and a portable self-retracting double reel having two cable drums, one providing for the conductor attached to the mower and the other providing for conductor cable extending to a stationary source of electric current.

18. In combination, an electrically driven traveling agricultural implement, means for conducting current thereto comprising a flexible conductor detachably connected thereto and a portable self-retracting double reel having two cable drums, one providing for the conductor attached to the implement and the other providing for conductor cable extending to a stationary source of electric current, said drums being mounted upon a single vertical shaft and being rotatable in horizontal planes whereby the conductor may be freely led away from either drum in various directions.

19. In combination, an electrically driven lawn mower, means for conducting current thereto comprising a flexible conductor detachably connected thereto and a portable self-retracting double reel having two cable drums, one providing for the conductor attached to the mower and the other providing for conductor cable extending to a stationary source of electric current, said drums being mounted upon a single vertical shaft and being rotatable in horizontal planes whereby the conductor may be freely led away from either drum in various directions, means for conducting current from the conductor on one drum to the conductor on the other, notwithstanding rotation of the drums.

20. In combination, an electrically driven lawn mower, means for conducting current thereto comprising a flexible conductor detachably connected thereto, and a portable self-retracting double reel having two spring operated drums, one providing for the conductor attached to the mower and the other providing for conductor cable extending to a stationary source of electric current, the spring operated drums serving to hold the conductors constantly under tension during the operation of the mower, the conductor to the mower extending in a general direction opposite to the conductor to the source of current and thereby substantially equalizing the tension thereof at the reel.

21. In combination, an electric motor driven traveling implement, means for supplying current to the motor thereof comprising a flexible conductor detachably fixed to the implement and extending directly to a portable self-retracting spring reel, the reel being provided with means for directly engaging the earth to temporarily affix and retain the same at any convenient point notwithstanding variable spring tension on the conductor.

22. In combination, an electric motor driven traveling implement, means for supplying current to the motor thereof comprising a flexible conductor detachably fixed to the implement and extending directly to a portable self-retracting spring reel, the reel being provided with means for directly engaging the earth to temporarily affix and retain the same at any convenient point notwithstanding variable spring tension on the conductor, said reel also having its drum rotatable in a horizontal plane whereby the conductor may be freely led away therefrom in various horizontal directions.

In testimony whereof I have signed my name to this specification.

PAGE S. HASELTON.